United States Patent
Salyer

(10) Patent No.: US 6,463,212 B1
(45) Date of Patent: *Oct. 8, 2002

(54) WATER HEATING UNIT WITH INTEGRAL THERMAL ENERGY STORAGE

(76) Inventor: Ival O. Salyer, 6325 Shady Knoll Dr., Dayton, OH (US) 45414

(*) Notice: Subject to any disclaimer, the term of this patent is extended or adjusted under 35 U.S.C. 154(b) by 0 days.

This patent is subject to a terminal disclaimer.

(21) Appl. No.: 09/507,584

(22) Filed: Feb. 21, 2000

Related U.S. Application Data

(63) Continuation-in-part of application No. 08/791,001, filed on Jan. 30, 1997, now Pat. No. 6,047,106.

(51) Int. Cl.[7] .................................. F24H 7/02
(52) U.S. Cl. ................... 392/341; 392/456; 126/400; 165/10; 165/902
(58) Field of Search .................... 392/449, 450, 392/451, 452, 453, 454, 341, 456; 165/10, 902, 158; 126/400

(56) References Cited

U.S. PATENT DOCUMENTS

| | | |
|---|---|---|
| 2,911,513 A | 11/1959 | MacCracken |
| 3,401,682 A | 9/1968 | Jakob |
| 3,485,216 A | 12/1969 | Lawrence |
| 4,182,398 A | 1/1980 | Salyer et al. |
| 4,362,207 A | 12/1982 | Farfaletti-Casali et al. |
| 4,617,332 A | 10/1986 | Salyer et al. |
| 4,711,813 A | 12/1987 | Salyer |
| 4,797,160 A | 1/1989 | Salyer |
| 4,825,939 A | 5/1989 | Salyer et al. |
| 4,964,402 A | 10/1990 | Grim et al. |
| 5,053,446 A | 10/1991 | Salyer |
| 5,075,343 A | * 12/1991 | Blount ................ 521/85 |
| 5,106,520 A | 4/1992 | Salyer |
| 5,211,949 A | 5/1993 | Salyer |
| 5,254,380 A | 10/1993 | Salyer |
| 5,282,994 A | 2/1994 | Salyer |
| 5,387,780 A | * 2/1995 | Riley ................ 219/688 |
| RE34,880 E | 3/1995 | Salyer |
| 5,565,132 A | 10/1996 | Salyer |
| 5,687,706 A | 11/1997 | Goswami et al. |
| 5,694,515 A | 12/1997 | Goswami et al. |
| 5,943,876 A | 8/1999 | Meyer et al. |
| 6,047,106 A | * 4/2000 | Salyer ................ 392/341 |
| 6,192,703 B1 | 2/2001 | Salyer et al. |
| 6,221,456 B1 | 4/2001 | Pogorski et al. |

FOREIGN PATENT DOCUMENTS

| | | |
|---|---|---|
| CH | 468602 | 3/1969 |
| FR | 2570476 | 3/1986 |
| GB | 398927 | 9/1933 |
| GB | 1196336 | 6/1970 |
| GB | 2035764 | 6/1980 |
| JP | 0107045 | 4/1989 |

OTHER PUBLICATIONS

Salyer, Ival O. and Sircar, Anil K., "Phase Change Materials for Heating and Cooling of Residential Buildings and Other Applications" from the University of Dayton Research Institute.

Salyer, Ival O. et al., "Advanced Phase–Change Materials for Passive Solar Storage Applications" Society of Automotive Engineers, Inc. 1985.

* cited by examiner

*Primary Examiner*—Jiping Lu
(74) *Attorney, Agent, or Firm*—Killworth, Gottman, Hagan & Schaeff, L.L.P.

(57) ABSTRACT

The present invention is directed to a water heater which includes a material having a thermal energy capacity of at least about 25 cal/g and having a freezing/melting temperature from about 20° C. to about 100° C. The water heater include a source of water, a heating element for heating the water, a heat exchange unit which contains the material, and a plurality of heat exchange tubes positioned in the heat exchange unit, which tubes are in heat transfer relation to the material so that heat stored in the material can be transferred to the water.

5 Claims, 4 Drawing Sheets

WATER HEATING UNIT WITH INTEGRAL THERMAL ENERGY STORAGE

CROSS REFERENCE TO RELATED APPLICATIONS

This application is a continuation-in-part of U.S. application Ser. No. 08/791,001 filed Jan. 30, 1997 now U.S. Pat. No. 6,047,106.

BACKGROUND OF THE INVENTION

Conventional water heaters provide heated water by storing heat energy in the water. Because the heat energy is stored in the water, a large portion of the heater must be dedicated to storing the heated water until it is used. Typically, water stores approximately 10 calories/gram of heat per 10° C. increments. By requiring a large portion of the heater for storage of heated water, the water heater must be of reasonable size to store enough heated water for use in a standard residential environment. Typical residential water heaters have a 50–60 gallon capacity. For use in buildings and industry, water heaters must be even larger.

Water heaters consume a high percentage of residential energy heating water for bathing, washing dishes, washing clothes and heating homes and offices. In homes heated by electricity, the consumption of electric power is even greater. Overall, a large imbalance in electric power usage exists during the day time due primarily to the large amounts of power consumed by industry, businesses and public transportation. In many locations, day time peak usage is twice that of the night hours. To compensate for the extensive day time use of electric power, utility companies provide generating capacity sufficient to supply day time usage, leaving unused capacity available for the night hours.

In order to reduce an ever expanding need for day time power, utility companies are providing incentive pricing for off-peak power usage to encourage more use of the existing surplus night power capacity. This practice is common in Japan, in some European countries, and in a few locations in the United States.

Further, the ever increasing use of fossil fuels world wide for heating and cooling applications contributes significantly to the depletion of irreplaceable raw materials. Additionally, the burning of fossil fuels of all kinds is resulting in atmospheric pollution with nitrogen oxides and in higher concentrations of carbon dioxide in the atmosphere. The carbon dioxide buildup is of increasing concern because it may eventually result in drastic changes in global climates through global warming.

Thus, a need has arisen in the art for a water heater which can more efficiently heat water, which can make effective use of utilities during off-peak hours to minimize building and household power consumption and which would consequently reduce building and household utility costs. Further, there is an urgent need to adopt energy conservation technologies to stretch the supply of available fossil fuels until non-polluting energy can be developed and implemented.

SUMMARY OF THE INVENTION

The present invention solves the existing needs in the art by providing a water heater which can more effectively heat water, which can make efficient use of electricity during off-peak hours to minimize household power consumption in homes using electricity and which consequently reduces household utility costs. The invention also addresses the need to reduce fossil fuel consumption and the resulting air pollution and carbon dioxide build-up through the use of renewable solar photovoltaic and wind energy to supply all the power for the water heater.

The water heater includes a material, preferably a phase change material, having a thermal energy capacity of at least about 25 cal/g and having a freezing/melting temperature from about 20° to about 100° C., and more preferably, from about 40° C. to about 80° C. The water heater further includes a source of water; a heating element for heating the water from the source; a heat exchange unit which contains the material; and a plurality of heat exchange tubes positioned in the heat exchange unit, with the material being located between and around the heat exchange tubes, where the tubes are in heat transfer relation to the phase change material and in fluid connection with the source of water so that the water heated by the heating element flows through the tubes and heats the material. Thereafter, the heat stored in the material is transferred through the tubes to water flowing therethrough at nearly constant temperatures equivalent to the freezing/melting temperature of the material.

Preferably, the water heater further includes a shell having an exterior surface, the heating element and the heat exchange unit being enclosed in the shell, and a layer of insulation on the exterior surface of the shell. The insulation preferably has an "R" value of at least about 10 and more preferably comprises vacuum panel insulation having an "R" value of at least about 20 per inch of thickness.

In use, the heating element heats water which then heats the phase change material. In one embodiment of the invention, the material is in the form of a powder comprising a phase change material and finely divided silica particles. In this embodiment, the phase change material preferably comprises a crystalline alkyl hydrocarbon. In a preferred embodiment, the material comprises from about 50 to 80% by weight of the phase change material and about 20% to 50% by weight silica particles, and more preferably, about 65% by weight of the phase change material and about 35% by weight silica particles.

In another embodiment of the invention, the material is in the form of a reversible gel which comprises a phase change material and finely divided silica particles. In this embodiment, the phase change material is selected from the group consisting of linear alkyl hydrocarbons, fatty acids, and fatty acid esters. In one embodiment, the gel comprises from about 25 to 70% by weight of a fatty acid phase change material and from about 15 to 30% by weight finely divided silica particles. In another embodiment, the reversible gel comprises from about 78 to 90% by weight of a linear alkyl hydrocarbon phase change material and from about 10 to 22% by weight finely divided silica particles.

In yet another embodiment of the invention, the material used in the water heater is a phase change material comprising a primary alcohol. The phase change material may be in the form of 100% liquid primary alcohol. Alternatively, the phase change material may be in the form of a powder comprising a mixture of a primary alcohol and a silica dry powder. In another embodiment, the phase change material is in the form of a reversible gel comprising a mixture of a primary alcohol and silica particles. In yet another embodiment, the phase change material comprises a solid melt mix of a primary alcohol, high density polyethylene, ethylene-vinyl acetate and silica.

In yet another embodiment of the invention, the material is a phase change material selected from the group consisting of primary alcohols, linear alkyl hydrocarbons, fatty acids, and fatty acid esters. In this embodiment, the material is imbibed into a foam which surrounds the heat exchange tubes of the water heater. Preferably, the foam is an open-celled foam having nano-sized pores.

In still another embodiment of the invention, the material is a salt hydrate phase change material. In this embodiment, the phase change material is selected from the group consisting of sodium sulfate decahydrate, calcium chloride hexahydrate, trisodium phosphate dodecahydrate, and sodium acetate trihydrate.

Accordingly, it is an object of the present invention to provide a water heater which employs a material such as a phase change material to heat water. These, and other objects and advantages of the present invention, will become apparent from the following drawings, detailed description and claims.

DETAILED DESCRIPTION OF THE INVENTION

Figure 1:
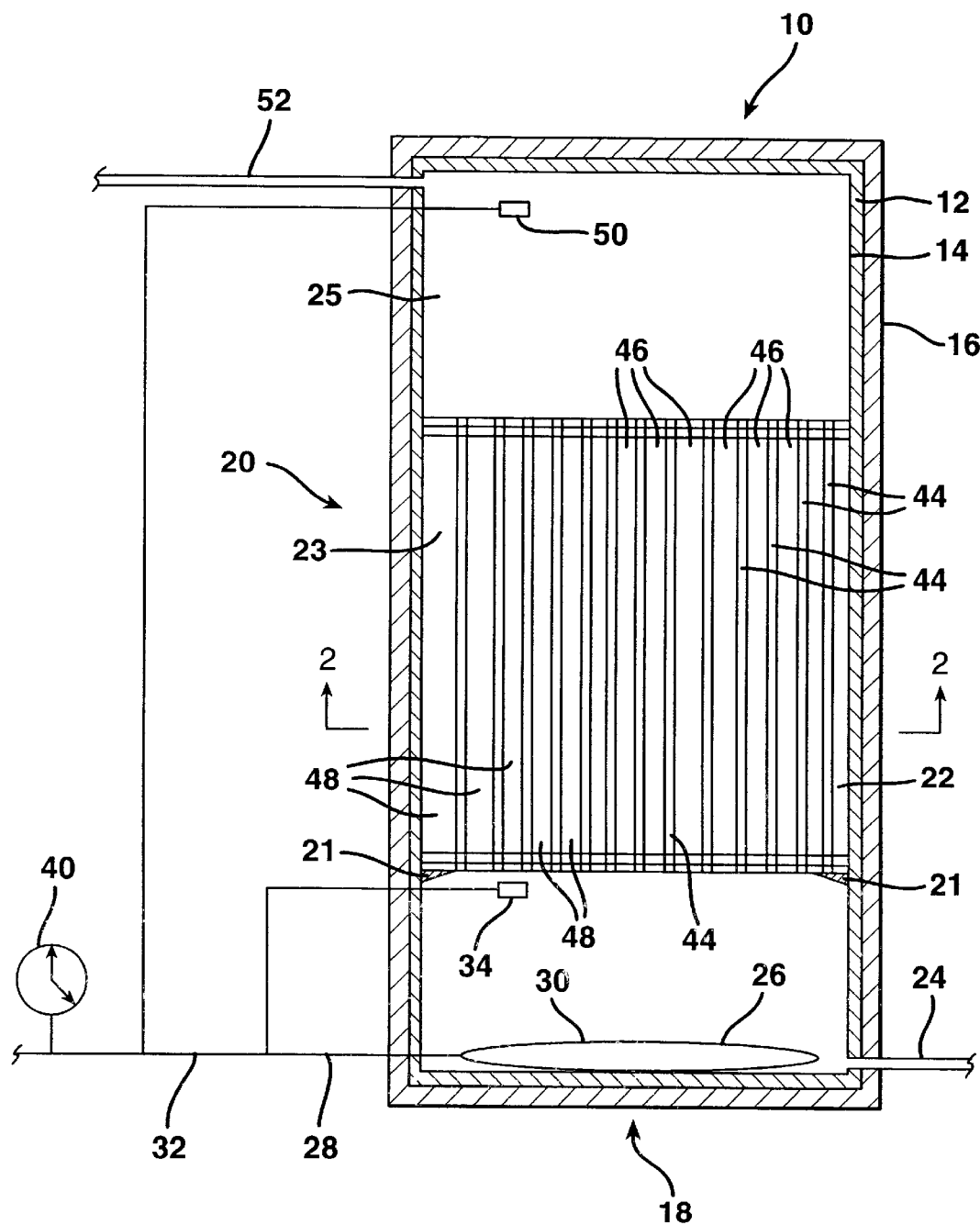
FIG. 1 is a partial cross sectional view of one embodiment of the water heater of this invention.

FIG. 1 presents a partial cross sectional view of the water heater 10 of this invention. The water heater 10 comprises a shell 12 having an exterior surface 14 and insulation material 16. The shell 12 can be any shape and is desirably cylindrical. The insulation material 16 is attached to the outside surface 14 of the shell 12 and desirably covers the entire exposed outside surface 14 of the shell 12. Preferably, the insulation material 16 will have an "R" value of at least about 10. More preferably, the insulation material 16 is vacuum panel insulation having an "R" value of 20 per inch of thickness or greater. The shell 12 includes a heating apparatus 18 and a heat exchanger 20. Water is supplied to the water heater 10 by means of a water inlet line 24.

Heating apparatus 18 includes a first heating element 26 which is connected to a power supply (not shown) by a first power supply medium 28. In the embodiment shown in FIG. 1, the heating apparatus 18 is located beneath the heat exchanger 20. To control the water temperature of the water heated by the first heating element 26, heating apparatus 18 may also include a first thermostat 34 which is connected to the first power supply medium 28.

First heating element 26 may be either an electric resistance heating coil 30, as shown in FIG. 1, a gas burning heating element or an oil burning heating element. If first heating element 26 is an electric resistance heating coil 30, then first power supply medium 28 will be an electric power line 32, as shown in FIG. 1. The electric heating coil 30 can be either an alternating current or a direct current heating coil. If the electric heating coil 30 is a direct current heating coil, then power could be supplied to it, for example, by either a photovoltaic cell, a wind turbine or another alternative direct current energy source.

If first heating element 26 is a gas burning heating element or an oil burning heating element, then first power supply medium 28 will be a gas line or an oil line. Further, one skilled in the art will appreciate that if a gas burning heating element or an oil burning heating element is used with the water heater 10, then water heater 10 will include an a second heat exchanger to transfer heat from the flame of the heating element to heat exchanger 20. Such a modification is within the skill of one skilled in the art.

Heat exchanger 20 contains a heat exchange unit 22 which comprises a first compartment 23 and a second compartment 25. Heat exchange unit 22 is self contained and mounted on a ledge 21 inside of shell 12. First compartment 23 includes a plurality of heat exchange tubes 44 and heat exchange material 46. The heat exchange tubes 44 are located in the first compartment 23 of the heat exchanger 20. Desirably, heat exchange tubes 44 will be positioned substantially vertically in first compartment 23. The heat exchange tubes 44 can have any cross sectional shape and are desirably formed from any heat conducting material. Most desirably, the tubes 44 are formed from either copper or aluminum. The heat exchange tubes 44 can be maintained in position by being banded together by at least one band and/or being supported by a sealed top cover and bottom cover (not shown), each having a plurality of openings.

The heat exchange material 46 is positioned in the heat exchanger 20 such that the heat exchange material 46 is in heat transfer relation to the heat exchange tubes 44. The heat exchange material 46 is preferably a phase change material 48. The heat exchange material 46 is contained in the heat exchanger 20 such that it will not come into contact with water when the tank 10 is filled. The containment of heat exchange material 46 in heat exchanger 20 is described below.

Second compartment 25 can either be an integral portion of the heat exchanger 20 or a separate compartment in water heater 10. As shown in FIG. 1, second compartment 25 is separated from heat exchanger 20. The second compartment 25 can include a second thermostat 50 which is connected to the first electric lines 28 and which is provided to prevent overheating of the water by the first heating element 26. A water outlet line 52 is connected to the second compartment 25 to allow heated water to flow from the water heater 10.

The water heater 10 may also include an associated timer 40 connected with the first power supply medium 28. The timer 40 is provided to control the power usage of the heater 10 during designated time periods, e.g. turning off the first power supply medium 28 during peak usage hours.

Figure 2:
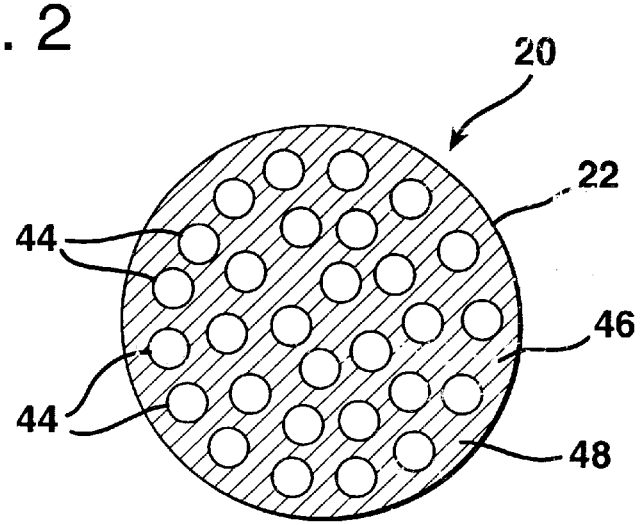
FIG. 2 is a cross sectional view along line 2—2 of FIG. 1 of one embodiment of the heat exchange unit.

FIG. 2 presents a cross sectional view of heat exchanger 20 along line 2—2 in FIG. 1. As can be seen in FIG. 2, the heat exchange material 46 is located between and around the heat exchange tubes 44 to substantially fill any spaces between the heat exchange tubes 44. The heat exchange material 46 is located in heat transfer contact with the heat exchange tubes 44 so that as water flows through heat exchange tubes 44, heat can be transferred from the phase change material 48 to the water and vice versa. In this embodiment, the heat exchange tubes 44 are spaced so that a maximum amount of the heat exchange material 46 can be placed in heat exchange unit 22 of heat exchanger 20.

Figure 3:
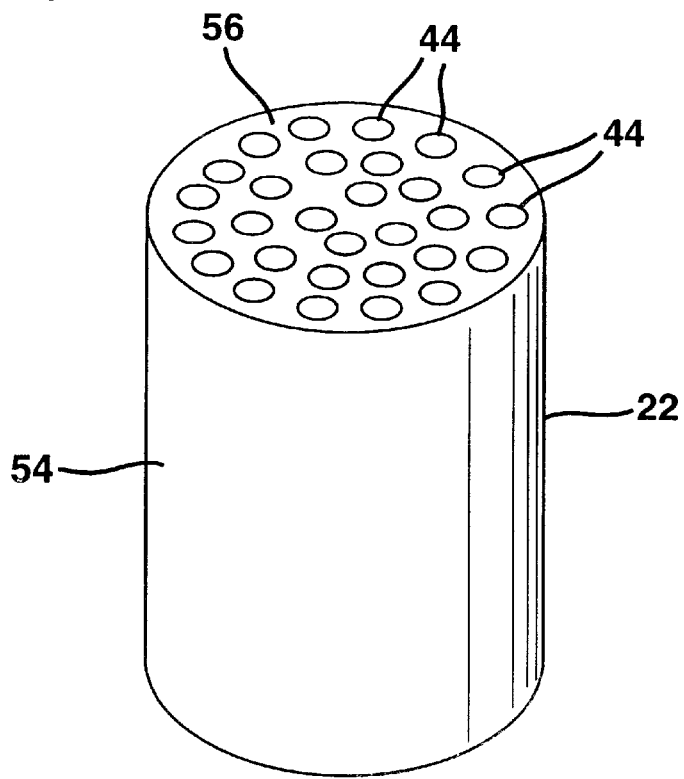
FIG. 3 is perspective view of the embodiment of the heat exchange unit shown in FIG. 2.

FIG. 3 presents a perspective view of the heat exchange unit 22 shown in cross section in FIG. 2. The heat exchange tubes 44 are contained in a sealed container 54 which is covered by top cover 56 and the bottom cover (not shown). Openings 72 correspond in position with the open ends of tubes 44 to allow water to flow through container 54. By providing sealed cover 56 and the bottom cover to contain the heat exchange tubes 44, the heat exchange material 46 is prevented from becoming wetted by the water while the water heater 10 is in use. Further, by providing the heat exchange tubes 44 and the heat exchange material 46 in container 54, heat exchange unit 22 can be placed into and removed from shell 12 of water heater 10 as a single unit.

The water heater 10 of the present invention functions in the following manner. Water is supplied to the heater 10 through water inlet line 24 into shell 12. The water in shell 12 is then heated by first heating element 26. The temperature of heating element 26 can be monitored by first thermostat 34 to prevent overheating of the water and/or the phase change material 48. The heated water is then passed through the heat exchanger 20. In the heat exchanger 20 shown in FIGS. 2 and 3, the water flows through the first compartment 23 of heat exchanger 20 through means of heat exchange tubes 44. In the heat exchanger 20, heat from the heated water is transferred to the heat exchange material 46 from the water to heat the heat exchange material 46 by means of the heat exchange material 46 being in heat transfer contact with the heat exchange tubes 44. The water passes through heat exchange unit 22 by means of a thermosiphon process, i. e., the heated water rises to the top of the shell 12 through heat exchange unit 22 by means of its specific gravity being lower than that of the lower temperature water in the water heater 10. The heated water is then stored in the second compartment 25 of heat exchanger 20.

When the heating apparatus 18 is not in operation, e.g., during peak times of power usage, the heat exchanger 20 heats the water. Once the temperature of the water approaches the freezing/melting point of the heat exchange material 46, heat is transferred from the heat exchange material 46 to the water. As the heat is transferred to the water, the temperature of the water is raised. Because the latent heat of the heat exchange material 46 is greater than the sensible heat of water, heat exchange material 46 provides a more efficient storage material for storing heat in heater 10 than water does in conventional water heaters. Further, the heated water is supplied by water heater 10 at nearly constant temperature equivalent to the freezing point of the phase change material 48. This "plateau" of constant temperature remains until the latent heat capacity of the phase material 48 has been used up. This further differs from conventional water heaters in which heated water is delivered on a thermocline of descending temperature.

Figure 4:
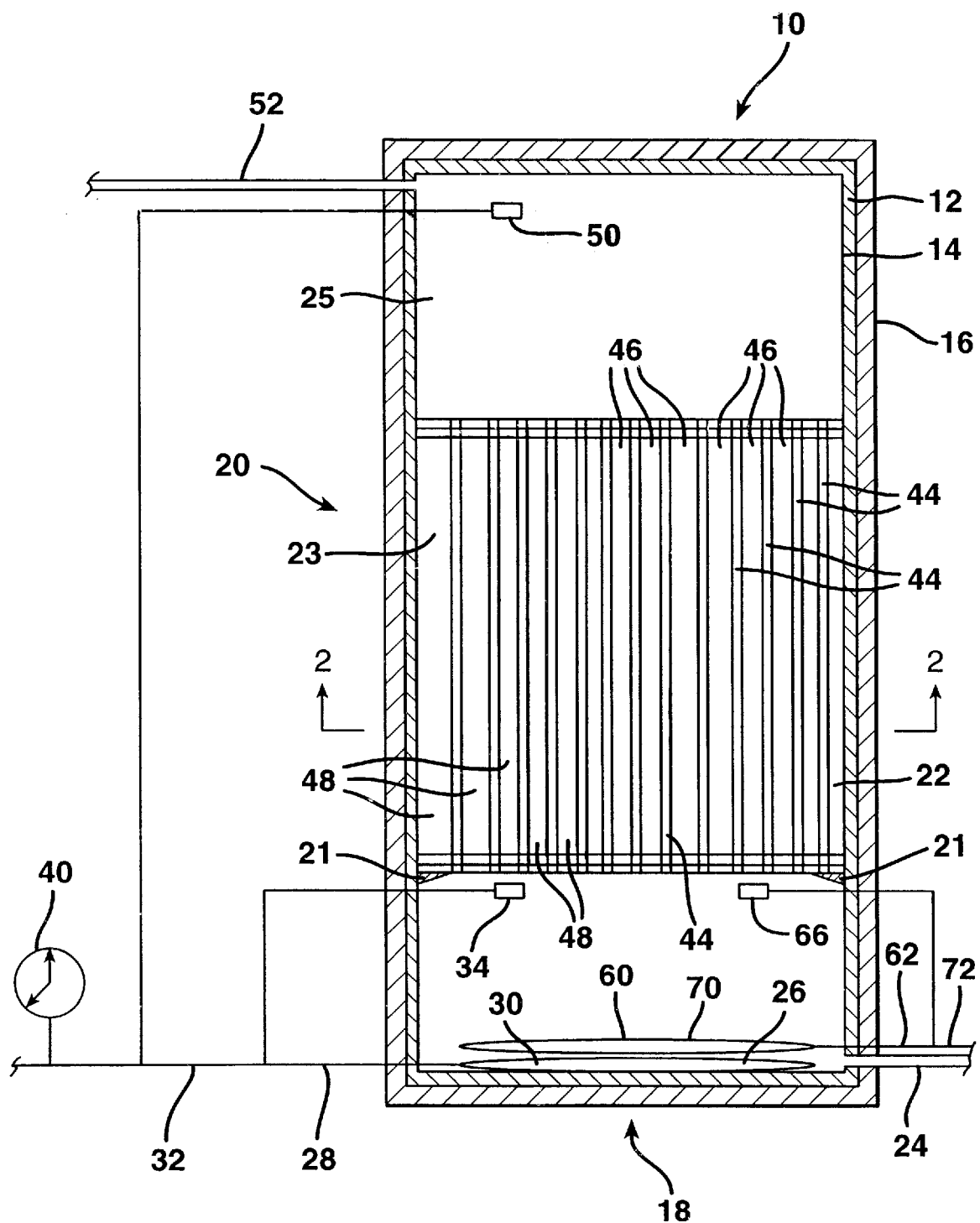
FIG. 4 is a partial cross sectional view of a second embodiment of the water heater of the invention.

FIG. 4 presents a partial cross sectional view of another embodiment of this invention. In this embodiment, the heating apparatus 18 includes a first heating element 26, as described above, and a second heating element 60 which is connected to a second power supply (not shown) by a second power supply medium 62. Second element 60 may be an electric resistance heating element, a gas powered heating element, or an oil powered heating element. Heating apparatus 18 may also include a third thermostat 66 which is connected to the second power supply medium 62. The remaining elements of the water heater 10 are the same as described above and function as they are described above.

In this embodiment, the second heating element 60 is an electric resistance coil 68. The second heating element 60 is provided so that the water heater 10 would have a second source of heat during times at which the first heating element 26 is not in operation. The second heating element 60 will desirably be a direct current resistance heating element 70. With a direct current resistance heating element, power can be supplied to second heating element 60 by a direct current power supply 72, such as a photovoltaic cell or a wind turbine. Thus, water and the heat exchange material 46 could be heated by the second heating element 60 during peak hours of consumption of conventional energy, such as alternating current electricity and gas, and heated by the first heating element 26, which is powered by conventional power sources,during off-peak hours. This would reduce peak hour consumption of conventional power sources, such as alternating current electricity, oil and gas, and provide a further savings in money spent on power for the water heater 10. In geographic areas of high solar insolation or persistent winds, these power sources may support the total heating of water heater 10.

The present invention makes use of phase change materials 48 in a variety of forms to serve as the heat exchange material 46. The phase change materials 48 will have melting/freezing temperatures from about 20° C. to about 100° C., more preferably, from about 40° C. to about 80° C., and most desirably, about 70° C. to efficiently maintain the temperature of the water at a temperature which provides a sensation of warmth when touched. The phase change materials 48 useful with this invention will have a latent heat greater than the sensible heat of liquid water. Desirably, they will have a heat capacity of at least about 25 cal/g.

The phase change materials 48 store heat energy from the water and provide heat to the water when necessary. Phase change materials 48 may be repeatedly converted between solid and liquid phases to utilize their latent heats of fusion to absorb, store and release heat during such phase conversions. These latent heats of fusion are greater than the sensible heat capacities of water. For example, in phase change materials 48, the amount of energy absorbed upon melting or released upon freezing is much greater than the amount of energy absorbed or released upon increasing or decreasing the temperature of water over an increment of 10° C. In fact, phase change materials 48 can store approximately three to five times more energy than water. Thus, by using phase change materials 48 to store heat instead of storing heat in the water, the water heater 10 can provide three to five times more heated water than a conventional water heater. Alternatively, the water heater 10 could be ⅓–⅕ the size of a conventional water heater and still provide the same amount of heated water.

Upon melting and freezing, the phase change material 48 absorbs and releases substantially more energy per unit weight than a sensible heat storage material that is heated or cooled over the same temperature range. In contrast to a sensible heat storage material which absorbs and releases energy essentially on a thermocline over a broad temperature range, the phase change material 48 absorbs and releases a large quantity of energy in the vicinity of its melting/freezing point. Additionally, the heated water is delivered at a nearly constant temperature which can be selected to be in the temperature range that is comfortable for bathing and other household activities.

By using phase change materials to store and release heat energy from and to water, the temperature of the water produced by the water heater 10 can be controlled through selection of the phase change material 48 based upon its freezing/melting temperature. For example, in home use, a useful water temperature typically does not exceed about 60° C., thus a phase change material having a melting temperature of approximately 70° C. would be ideal. In situations where higher water temperatures are desired, then phase change materials with higher freezing/melting temperatures could be used.

One phase change material 48 which can be used to form the heat exchange material 46 is in the form of a reversible gel as described in U.S. Ser. No. 08/929,899 filed Sep. 15, 1997, entitled "GEL COMPOSITIONS FOR THERMAL ENERGY STORAGE", which is hereby incorporated by reference. In this embodiment, the phase change material comprises a linear alkyl hydrocarbon which is combined with finely divided silica particles. An example of a linear alkyl hydrocarbon which may be used in this embodiment is an average C-34 carbon alkyl hydrocarbon available from the Petrolite Corp. under the designation Polywax 500, which melts and freezes at about 72° C. and has a thermal energy of about 58 cal/g. The silica particles used with the linear alkyl hydrocarbon may comprise precipitated or fumed silica and may be hydrophylic or hydrophobic. The silica particles may be rendered hydrophobic by treatment with about 15 pph of a silane coupling agent. The silica particles preferably have a density of about 2.0 and a particle size of about 0.005 to 0.025 microns.

Where the phase change material is in the form of a dry powder, the preferred mixture comprises about 70% by weight phase change material and about 30% by weight silica particles as disclosed in U.S. Pat. No. 5,106,520 entitled DRY POWDER MIXES COMPRISING PHASE CHANGE MATERIALS, the disclosure of which is incorporated herein by reference. The phase change material preferably comprises crystalline alky hydrocarbons having a carbon chain of about $C_{14}$ of greater which include a number of commercially available waxes. Suitable waxes include Shellwax®120, Shellwax®300, and Shellwax®176, all available from Shell Oil Co., Boron R-152, available from Standard Oil of Ohio, and Aristowax®143 and Paraffin 150, available from Exxon.

Preferred silica particles for use in this embodiment are those having particle sizes of about 0.007 to about 0.07 microns. Suitable silicas include fumed and precipitated silicas. Examples include the "Cab-o-Sil®" series of fumed silicas available from Cabot Corporation, and the Aerosil®, FK, Sipernat®, Ultrasil® and Quso® series of silicas available from DeGussa. Other suitable silicas include ABS and other precipitated silicas available from PPG.

Where the phase change material comprises a primary alcohol, suitable primary alcohols include those disclosed in U.S. application Ser. No. 60/124,412, filed Mar. 15, 1999, entitled LINEAR PRIMARY ALCOHOLS AS PHASE CHANGE MATERIALS FOR THERMAL ENERGY STORAGE", which is hereby incorporated by reference. The primary alcohols may be combined with fumed or precipitated silica (hydrophylic or hydrophobic) and calcium silicate, in the form of reversible gels or dry powders. Alternatively, the primary alcohol phase change materials may be provided in the form of a solid melt mix of primary alcohol/high density polyethylene (HDPE)/ethylene-vinyl acetate/silica or a melt mix of primary alcohol/ polypropylene/EVA/silica, in the percentages of about 60/16/8/16 by weight. Primary alcohol phase change materials suitable for use in the present invention are commercially available from Petrolite-Baker Corp. under the trade name PETROLITE in a wide range of carbon chain lengths and from Amoco under the trade names EPAL and SURFOL in a wide range of carbon chain lengths (6, 8, 10, 12, 14, 16, 18 and 20) to provide controlled temperatures from −100° C. to above 100° C. A preferred silica for use is a precipitated hydrophylic silica having a particle size of 0.005 to 0.025 microns and a surface area of 100 m² per gram or more. An example is ABS silica from PPG Industries of Pittsburgh, Pa., which is a normal, hydrophilic silica with a surface area of 150 m²/gram and a particle size of about 0.022 microns.

The phase change material 48 may also comprise a salt hydrate phase change material such as sodium sulfate decahydrate, calcium chloride hexahydrate, trisodium phosphate dodecahydrate, and sodium acetate trihydrate. Preferably, the phase change material comprises trisodium phosphate dodecahydrate.

Figure 5:
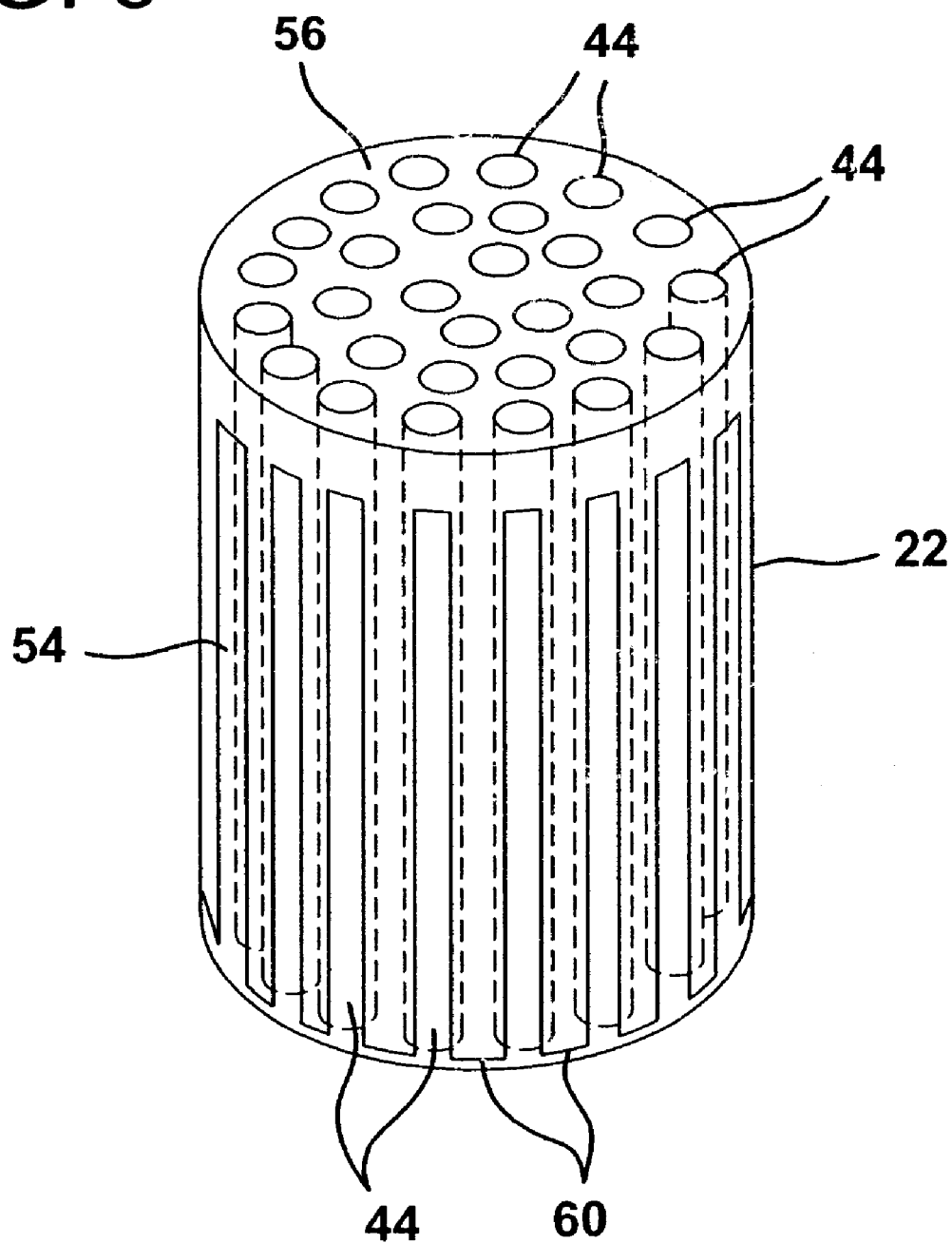
FIG. 5 is a perspective view of the heat exchange unit illustrating the use of a foam imbibed with a phase change material.

In another embodiment of the invention illustrated in FIG. 5, the phase change material may be imbibed into a cored foam 60 which is designed to fit around the heat exchange tubes 44 as shown. The foam may be imbibed with a primary alcohol phase change material as described above, a linear alkyl hydrocarbon phase change material such as Polywax 500 as described above, or a fatty acid or fatty acid ester phase change material of suitable high melting temperature. Suitable foams for use in the present invention include open-celled polyurethane vacuum insulation foams available from Huntsman-ICI, which have approximately 94% empty space and Dow open-celled polystyrene foams, available from Dow Chemical under the designation INSTILL™, which have about 92% empty space (based on a density for polystyrene of 1.06 and the foam weight of 5.5 pounds per cubic foot). Another suitable foam is Cabot silica foam, available from Cabot Corporation under the designation NANO-GEL. These open-celled nano-sized pore foams are preferably filled via vacuum imbibing which fills the space to about 100%.

While certain representative embodiments and details have been shown for purposes of illustrating the invention, it will be apparent to those skilled in the art that various changes in the compositions and apparatus disclosed herein may be made without departing from the scope of the invention, which is defined in the appended claims.

What is claimed is:

1. A water heater for heating water comprising:
    a phase change material having a thermal energy capacity of at least about 25 cal/g and having a freezing/melting temperature from about 20° C. to about 100° C.;
    a source of water;
    a heating element for heating the water from said source;
    a heat exchange unit which contains said phase change material;
    a plurality of heat exchange tubes positioned in said heat exchange unit with said phase change material located between and around said heat exchange tubes to substantially fill any spaces between said heat exchange tubes, said tubes being in heat transfer relation to said phase change material and in fluid connection with said source of water so that the water heated by said heating element flows through said tubes and heats said phase change material and thereafter the heat stored in said phase change material is transferred through said tubes to water flowing therethrough at nearly constant temperatures equivalent to the freezing/melting temperature of said phase change material;
    a shell having an exterior surface, the heating element and the heat exchange unit being enclosed in the shell; and
    a vacuum panel insulation having an "R" value of at least about 20 per inch of thickness on the exterior of said shell.

2. The water heater of claim 1 wherein the heat exchange tubes are positioned substantially vertically in said water heater above said heating element to permit upward flow of heated water by a thermo-siphon process.

3. The water heater of claim 1 wherein said phase change material has a freezing/ melting temperature from about 40° to about 80° C.

4. The water heater of claim 1 wherein said phase change material is selected from the group consisting of primary alcohols, linear alkyl hydrocarbons, and fatty acids and fatty acid esters.

5. A water heater for heating water comprising:
- a phase change material having a thermal energy capacity of at least about 25 cal/g and having a freezing/melting temperature from about 20° C. to about 100° C. wherein said phase change material is selected from the group consisting of primary alcohols, linear alkyl hydrocarbons, and fatty acids and fatty acid esters;
- a source of water;
- a heating element for heating the water from said source;
- a heat exchange unit; and
- a plurality of heat exchange tubes positioned in said heat exchange unit, wherein said phase change material has been imbibed in a foam, said foam containing said phase change material surrounding said heat exchange tubes, said tubes being in heat transfer relation to said phase change material and in fluid connection with said source of water so that the water heated by said heating element flows through said tubes and heats said phase change material and thereafter the heat stored in said phase change material is transferred through said tubes to water flowing therethrough at nearly constant temperatures equivalent to the freezing/melting temperature of said phase change material.

* * * * *